US009808921B2

(12) United States Patent
Christoff et al.

(10) Patent No.: US 9,808,921 B2
(45) Date of Patent: Nov. 7, 2017

(54) PRESS-FIT INSTALLATION TOOL WITH DYNAMIC LOAD ASSIST AND METHOD OF PRESS-FITTING

(71) Applicant: GM GLOBAL TECHNOLOGY OPERATIONS LLC, Detroit, MI (US)

(72) Inventors: Brian D. Christoff, Ann Arbor, MI (US); Travis S. Larson, Shelby Township, MI (US)

(73) Assignee: GM Global Technology Operations LLC, Detroit, MI (US)

(*) Notice: Subject to any disclaimer, the term of this patent is extended or adjusted under 35 U.S.C. 154(b) by 426 days.

(21) Appl. No.: 14/538,844

(22) Filed: Nov. 12, 2014

(65) Prior Publication Data

US 2016/0129571 A1 May 12, 2016

(51) Int. Cl.
*B23P 19/00* (2006.01)
*B25B 27/02* (2006.01)

(52) U.S. Cl.
CPC .................................... *B25B 27/02* (2013.01)

(58) Field of Classification Search
CPC ...... B25B 27/02; B25B 27/0035; B21J 15/02; B23P 19/02; B23P 19/027; B23P 18/04; B23Q 3/00; B23Q 3/082
USPC ............................................................ 29/525
See application file for complete search history.

(56) References Cited

U.S. PATENT DOCUMENTS 843,656 A 2/1907 Adell
2,384,707 A 9/1945 Sweet
2,960,864 A 11/1960 Watts
3,177,952 A 4/1965 West
4,919,216 A 4/1990 Ikegami
5,013,015 A * 5/1991 Fatheree ................. B25B 5/062 269/24
5,161,788 A * 11/1992 Guzzoni ................ B23Q 3/103 269/20
6,929,254 B2 * 8/2005 Steele ................... F15B 15/063 269/24
7,815,176 B2 * 10/2010 McIntosh ................ B25B 5/087 269/229
8,292,282 B2 * 10/2012 Gao ........................ B62D 65/10 269/27

(Continued)

FOREIGN PATENT DOCUMENTS

CN 1463391 A 12/2003
CN 201291440 Y 8/2009

(Continued)

*Primary Examiner* — Lee D Wilson

(74) *Attorney, Agent, or Firm* — Quinn IP Law

(57) ABSTRACT

A tool has a biased piston, a plunger, and a base contained in a tool body. The plunger is positioned between the biased piston and the base and in contact with the base. A tool head is fixed to the base and extends outside of the tool body. The tool body is configured to be movable along a longitudinal axis relative to the base and plunger to move the plunger to load the piston when a load is applied to the tool body along a first load path. The tool body, the base, and the biased piston are configured to align the plunger with the longitudinal axis only when the load applied along the first load path is at least a first predetermined load, and thereby release stored energy of the piston as a dynamic load applied to the tool head along a second load path.

15 Claims, 3 Drawing Sheets

(56) References Cited

U.S. PATENT DOCUMENTS

| | | | | |
|---|---|---|---|---|
| 8,459,626 | B2 * | 6/2013 | Sawdon | B25B 5/062<br>269/228 |
| 2006/0202401 | A1 * | 9/2006 | Shinozaki | B23Q 1/035<br>269/27 |
| 2016/0129571 | A1 * | 5/2016 | Christoff | B25B 27/02<br>29/525 |

FOREIGN PATENT DOCUMENTS

| | | | |
|---|---|---|---|
| CN | 202021579 | U | 11/2011 |
| JP | H1044057 | A | 2/1998 |

* cited by examiner

PRESS-FIT INSTALLATION TOOL WITH DYNAMIC LOAD ASSIST AND METHOD OF PRESS-FITTING

TECHNICAL FIELD

The present teachings generally include a tool for press-fitting components and a method of press-fitting.

BACKGROUND

It is desirable for an operator using a hand tool to press-fit a component to be able to successfully and repeatedly install components at a favorable ergonomic load. In many applications, the operator can rely on tactile feedback to determine whether installation of the component is complete.

SUMMARY

A tool is provided that provides a dynamic assist load to enable the operator to work at relatively low ergonomic loads. Moreover, the tool can provide audible feedback to alert the operator when installation is complete. The tool has a tool body with a longitudinal axis. The tool also has a biased piston, a plunger, and a base contained in the tool body. The plunger is positioned between the biased piston and the base and in contact with the base. A tool head is fixed to the base and extends outside of the tool body. The tool body is configured to be movable along the longitudinal axis relative to the base and plunger to move the plunger so that the plunger loads the piston when a load is applied along a first load path. The first load path extends through the tool body, the plunger, the base, and the tool head. The tool body, the base, and the biased piston are configured to align the plunger with the longitudinal axis only when the load applied along the first load path is at least a first predetermined load, and thereby release stored energy of the piston as a dynamic load applied to the tool head along a second load path. For example, the predetermined load is a relatively low, ergonomic load applied by the tool operator. The dynamic load may be larger than the predetermined load applied by the tool operator, and the second load path extends through the plunger, the base, and the tool head, avoiding the tool body.

Because the dynamic load does not travel through the tool body, it is not reacted to the tool operator. Additionally, the dynamic load release is audible, indicating to the tool operator that installation is complete. The tool can be tuned to provide a desired dynamic load by selecting a desired biasing force of the piston, such as by selecting a spring stiffness if the piston is biased by a spring, or by selecting a compressible fluid that will provide a desired biasing force if the piston is biased by a compressible fluid. Additionally, different tool heads can be used to adapt the tool for press-fitting different components.

A method of press-fitting a component using a tool includes press-fitting a first component that includes a first tool head operatively connected to a tool body and configured to fit the first component. The press-fitting includes pushing the tool body toward the tool head to thereby load a piston within the tool body via a plunger within the tool body until the plunger aligns with the piston to release the loaded piston. The press-fitting also includes determining that the loaded piston has released by an occurrence of an associated audible sound of the piston releasing against the plunger. The method then includes withdrawing the first tool head from the first component after determining that the loaded piston has released.

The method may further include removing the first tool head from the tool body and operatively connecting a second tool head to the tool body. The second tool head is configured differently than the first tool head as it is configured to press-fit a second component configured differently than the first component. The second component may then be press-fitted using the tool by pushing the tool body toward the tool head to thereby load the piston via the plunger until the plunger aligns with the piston to release the loaded piston. Press-fitting of the second component includes determining that the loaded piston has released by another occurrence of the associated audible sound of the piston releasing against the plunger. The second tool head is then withdrawn from the second component.

If installation of the second component requires a different installation load, the method may further include, prior to press-fitting the second component, replacing a first spring biasing the piston during press-fitting of the first component with a second spring. The first spring has a first stiffness and the second spring has a second stiffness different than the first stiffness. By using the second spring, the tool is adapted for installation of the second component.

The above features and advantages and other features and advantages of the present teachings are readily apparent from the following detailed description of the best modes for carrying out the present teachings when taken in connection with the accompanying drawings.

DETAILED DESCRIPTION

Figures 1, 2, 3:
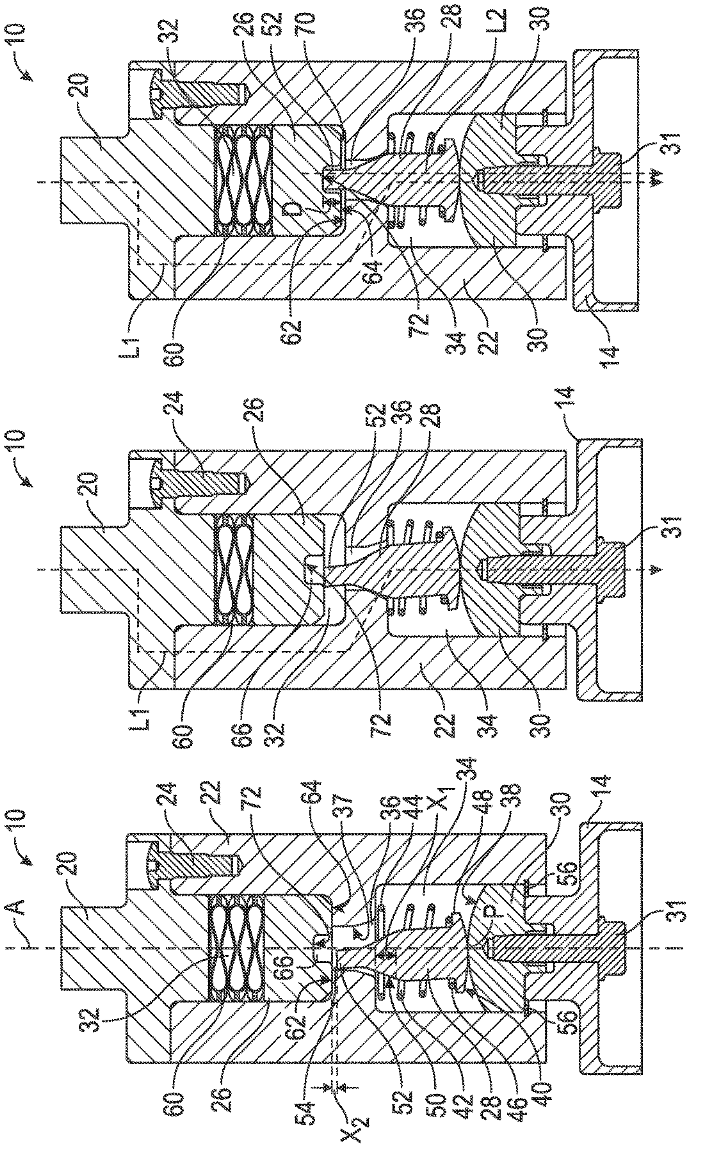
FIG. 1 is a schematic cross-sectional fragmentary illustration taken at lines 1-1 of FIG. 4 of a tool for press-fitting components with an imbalanced plunger and a piston both in a default, relaxed state prior to use.
FIG. 2 is a schematic cross-sectional fragmentary illustration of the tool of FIG. 1 in an interim state as the tool is being loaded by an apply load during press-fitting.
FIG. 3 is a schematic cross-sectional fragmentary illustration of the tool of FIG. 1 with the plunger moved to an aligned position and the loaded piston released to provide a dynamic assist load during press-fitting.
Figure 4:
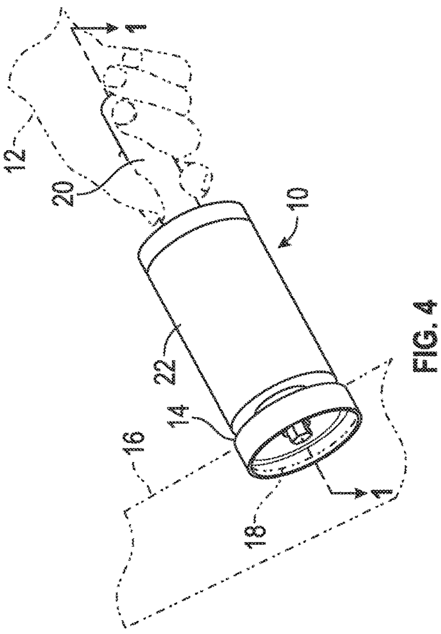
FIG. 4 is a schematic perspective illustration of the tool of FIGS. 1-3 and showing an operator's hand, a portion of a vehicle, and a first component being press-fitted to the vehicle, all in phantom.

Referring to the drawings, wherein like reference numbers refer to like components throughout the views, FIG. 1 shows a press-fit installation tool 10. The press-fit installation tool 10 is a hand-held tool, as shown in FIG. 4 with the hand of an operator 12 holding a tool head 14 of the tool 10 against a portion of a vehicle 16 to press-fit a first component 18 to the vehicle 16. The operator 12 holds a handle 20 that is secured to a tool body 22 with a fastener, such as with a screw 24, shown in FIG. 1. Other types of fasteners, such as but not limited to a bolt or a circlip (sometimes referred to as a C-clip or snap ring), could be used. The tool head 14 is operatively connected to the tool body 22 and extends outside of the tool body 22 as further explained herein. The tool 10 is human-powered, by force applied by the operator 12, and is not electronically or otherwise powered or actuated.

With reference to FIG. 1, the tool body 22 has a longitudinal axis A. In the embodiment shown, the axis A is a center axis of the tool body 22. A biased piston 26, an imbalanced plunger 28, and a base 30 are contained in the tool body 22. More specifically, the tool body 22 has a first cavity 32, a second cavity 34, and a tapered passage 36 connecting the first cavity 32 and the second cavity 34. The tapered passage 36 is centered along the longitudinal axis A, and the longitudinal axis A may also be referred to as the center axis of the tapered passage 36. The tool body 22 has a contoured surface 37 that defines the tapered passage 36. The contoured surface 37 is configured so that the tapered passage 36 is symmetrical about the longitudinal axis A, and tapers in width from the second cavity 34 to the first cavity 32. In other words, the tapered passage 36 is widest at the second cavity 34 and narrowest at the first cavity 32.

The plunger 28 is positioned between the biased piston 26 and the base 30 and in contact with the base 30. The tool head 14 is fixed to the base 30 by a bolt 31. The tapered passage 36, the plunger 28, and the base 30 are all configured such that the plunger 28 is in a tilted position relative to the longitudinal axis A as shown in FIG. 1 prior to application of an ergonomic predetermined load to the tool 10 by the operator during press-fitting. The base 30 has a first curved surface 38 and the plunger 28 has a contact surface 40 that is biased into contact with the first curved surface 38 by a biasing element 42 in the second cavity 34 biasing the contact surface 40 against the first curved surface 38. The biasing element 42 is a tapered coil spring in the embodiment of FIG. 1. The biasing element 42 is positioned in the second cavity 34 concentric with the longitudinal axis A. The biasing element 42 has a first end 44 positioned against the tool body 22 and a second end 46 positioned against a lip 48 of the plunger 28.

Both the first curved surface 38 and the contact surface 40 are convex such that contact is at a single contact point P. The contact point P can be referred to as an imbalance point and the plunger 28 can be referred to as an imbalanced plunger as the surfaces 38, 40 cause the plunger 28 to tend to tip relative to the longitudinal axis A. The plunger 28 has an outer surface 50 that tapers to a tip 52 opposite the lip 48. The biasing element 42 keeps the plunger 28 sufficiently far into the second cavity 34 such that the tip 52 does not extend out of the tapered passage 36 and does not contact the piston 26 when the tool 10 is not loaded. In other words, prior to loading the tool body 22 by application of the predetermined load, a gap 54 is maintained between the plunger 28 and the piston 26.

Prior to loading the tool body 22 by application of the predetermined load, the force of the biasing element 42 on the plunger 28 also forces the base 30 to a preload position shown in FIG. 1, in which the base 30 is held against a stopper 56. The stopper 56 may be an annular ring held in a slight notch in the tool body 22 and extending into the second cavity 34. Alternatively, the stopper 56 may be discrete tabs held by the tool body and extending into the cavity 34. With the plunger 28 and the base 30 in these pre-loading positions, the plunger 28 will tilt on the contact point P so that the tip 52 rests against the contoured surface 37 of the tool body 22 in the passage 36 and the plunger 28 is not in contact with the piston 26.

A wave spring 60 is positioned in the first cavity 32 and is configured to bias the piston 26 toward the passage 36. In other embodiments, a coil spring or other type of spring could be used as an alternative to a wave spring. Prior to loading the tool body 22 by application of the predetermined load PL indicated in FIG. 7, a biasing force of a wave spring 60 maintains the piston 26 against a surface 62 of the tool body 22 in the first cavity 32. The piston 26 has an outer surface 64 with a recess 66 that is substantially aligned with the tapered passage 36. The recess 66 may also be concentric with the longitudinal axis A, as shown in FIG. 1.

With reference to FIGS. 2 and 3, the tool body 22 is configured to be movable relative to the base 30 when the tool head 14 is held against an object to which the first component 18 is to be installed, such as the vehicle 16, and the operator 12 applies an application load to the tool body 22 through the handle 20 in the direction of the tool head 14. For example, the tool body 22 may be movable by sliding along the longitudinal axis A relative to the base 30 and the plunger. Movement of the surface 37 of the tapered passage 36 relative to the surface 50 of the plunger 28 causes the plunger 28 to move from the off-centered, imbalanced position of the relaxed state of FIG. 1 to the an interim position in FIG. 2 in which the plunger 28 extends into the first cavity 32. The plunger tip 52 is against the surface 64 of the plunger 28 in the interim position of FIG. 2, but not yet completely aligned with the longitudinal axis A. The interfacing of the plunger 28 with the surface 64 overcomes the biasing force of the spring 60, compressing the spring 60 to load the piston 26.

Figure 7:
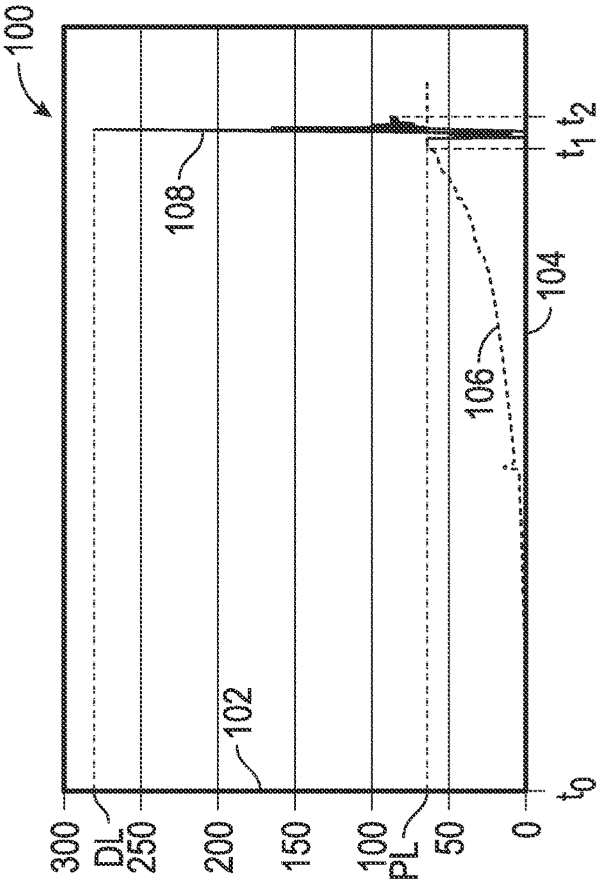
FIG. 7 is a schematic plot of the apply load and the dynamic assist load in Newtons versus time in seconds during the press-fitting using the tool of FIGS. 1-3.

FIG. 7 is a plot 100 of load force in Newtons on the vertical axis 102 versus time in seconds on the horizontal axis 104. The interim position of the plunger 28 corresponds to magnitudes of load 106 applied to the tool body 22 from zero at time $t_0$ to the predetermined load PL in FIG. 7, at time $t_1$. The load applied to the tool body 22 extends along a first load path through the tool body 22, the plunger 28, the base 30, and the tool head 14. The first load path L1 is schematically represented in FIG. 2.

When the load 106 applied by the operator 12 along the first load path L1 is at least a predetermined magnitude, the tool body 22, the base 30, and the biased piston 26 are configured to align the plunger 28 with the longitudinal axis A, as shown in FIG. 3. When the plunger 28 is aligned, the tip 52 enters the recess 66. This enables the piston 26 to move toward the plunger 28 on the longitudinal axis A by a distance D of the height of the recess 66 by allowing the spring 60 to decompress over the distance of the height of the recess 66, thereby releasing at least some of the stored energy of the piston 26 as a dynamic load 108 (shown in FIG. 7) applied to the tool head 14 along a second load path that extends through the plunger 28, the base 30, and the tool head 14, avoiding the tool body 22. The second load path L2 is shown schematically on FIG. 3. The dynamic load 108 along load path L2 assists the operator-supplied load 106 along load path L1. In other words, the dynamic load 108 from the release of the loaded piston 26 acts in the same direction on the tool head 14 as the predetermined load PL applied by the operator 12 to the tool body 22 through the handle 20.

The release of the piston 26 when the tip 52 is aligned with the longitudinal axis A and the piston 26 moves toward the tapered passage 36 is dynamic. In other words, stored energy is released over a period of time that is relatively short in comparison to the time over which the operator 12 moves the tool body 22 to apply the predetermined load PL. As indicated in FIG. 7, the operator-applied load 106 reaches the predetermined load PL over a relatively long period of time from time $t_0$ to time $t_1$. The dynamic load 108 is released over a relatively short time period from $t_1$ to $t_2$. Accordingly, the stored energy of the spring 60 resulting from the operator applied load 106 applied over a greater period of time $t_1$ is released as a dynamic load DL that has a greater magnitude DL.

The abrupt movement of the piston 26 when the tip 52 moves into the recess 66 creates a sound as the surface 72 of the piston 26 in the recess 66 contacts the tip 52. The sound provides audible feedback to the operator 12 as to when the predetermined load PL has been reached. Once the operator 12 hears the audible feedback, the operator 12 can withdraw the tool 10 from the vehicle 16 as installation of the first component 18 is complete.

As indicated in FIG. 3, the piston 26, the plunger 28 and the tool body 22 are configured so that a gap 70 is maintained between the surface 64 of the piston 26 and the surface 62 of the tool body 22 when the tip 52 is in the recess 66 and the stored energy of the piston is released, thereby preventing the second load path L2 from passing through the tool body 22. This prevents the dynamic load DL from being transferred to the tool operator through the tool body 22. The spring 60 may remain at least partially compressed (i.e., at least partially loaded) in the released position of FIG. 3.

The tool 10 can be tuned to allow the predetermined load PL to be a desired ergonomic level and to provide a desirable dynamic load DL depending on the overall load required for installation of the particular application. For example, the load applied by the operator 12 along the first load path L1 must be sufficient to overcome the force of the spring 60. The force of the spring is:

$F=K(X_1-X_2)$, where K is the spring constant, $X_1$ is the total distance that the tool body 22 moves in the direction along the longitudinal axis A from when the plunger 28 is in the relaxed position of FIG. 1 until the plunger 28 is in the aligned position of FIG. 3. $X_2$ is the distance that the tool body 22 moves along the longitudinal axis A before the plunger 28 contacts the piston 26 at an interim position, and is effectively the distance of the gap 54 along the longitudinal axis A. The difference between $X_1$ and $X_2$ is thus the distance that the piston 26 is moved along the longitudinal axis A against the force of the spring 60. The tool 10 can be tuned during the initial design of the tool 10 by selecting a spring 60 with a desired spring constant K. Additionally, the dimensions of the tool body 22 and the plunger 28 can be configured to provide a given distance over which the spring 60 is moved (i.e., $X_1-X_2$). The dimensions of the passage 36 and/or the diameter or height of the first cavity 32 can also be selected to achieve a desired resulting force F.

Figure 5:
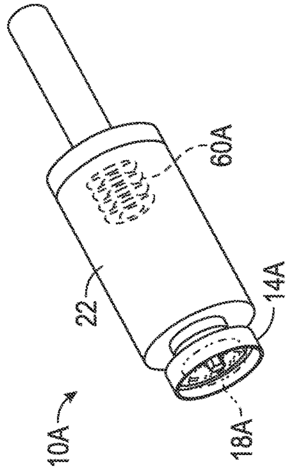
FIG. 5 is a schematic perspective illustration of the tool of FIG. 4 with a different tool head and a different biasing spring installing a second component.

An existing tool 10 with a given tool body 22 can also be modified as tool 10A shown in FIG. 5 by replacing the spring 60 with a different spring 60A having a different spring constant $K_A$. Spring 60A is represented in hidden lines inside of the tool body 22 in FIG. 5. The spring 60 can be removed from the first cavity 32 by loosening the screw 24 to remove the handle 20, removing the spring 60. Spring 60A can then be inserted into the first cavity 32, and the handle 20 can then be replaced on the tool body 22 and the screw 24 tightened. Spring 60A is represented as a coil spring, but could instead be a wave spring or another type of spring. The tool 10A may then be used with a different tool head 14A for press-fit installation of a differently configured second component 18A that requires a different installation load than the first component 18. The tool 10A may otherwise have all of the same components as tool 10. In other words, the tool 10 can be used for a different press-fitting application by changing the tool head 14 to tool head 14A, and replacing spring 60 with spring 60A.

Figure 6:
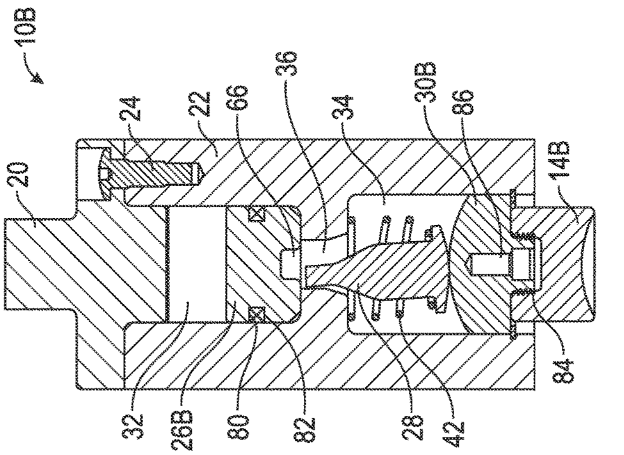
FIG. 6 is a schematic cross-sectional fragmentary illustration of an alternative embodiment of a tool for press-fitting components with an imbalanced plunger and a piston both in a default, relaxed state prior to use in accordance with an alternative aspect of the present teachings.

An alternative embodiment of a press-fit tool 10B is shown in FIG. 6. The tool 10B has many of the same components as tool 10 of FIG. 1. Components that are identical in configuration and function are indicated with identical reference numbers and are as described with respect to FIG. 1. In the embodiment of FIG. 6, the first cavity 32 is filled with a compressible fluid, such as air, at a predetermined pressure. A piston 26B is used that has a lateral groove 80 in which a seal 82 is placed for sealing the compressed fluid in the first cavity 32 as the piston 26B moves in the cavity 32 during use of the tool 10B. The seal 82 is shown as a quad seal, but could be any type of seal that provides a seal between two components which slide relative to one another. The tool 10B of FIG. 6 also illustrates another alternative mechanism for connecting a tool head 14B to a base 30B. In this embodiment, the base 30B has external threads and the tool head 14B has internal threads that mate with the external threads at threaded interface 84. The cavity 86 for receiving the bolt 31 of FIG. 1 may still be provided in the base 30B in order to allow flexibility for attachment of the tool head 14B to the base 30B. Alternatively, the threaded interface 84 can be provided without the option of a bolted connection.

Figure 8:
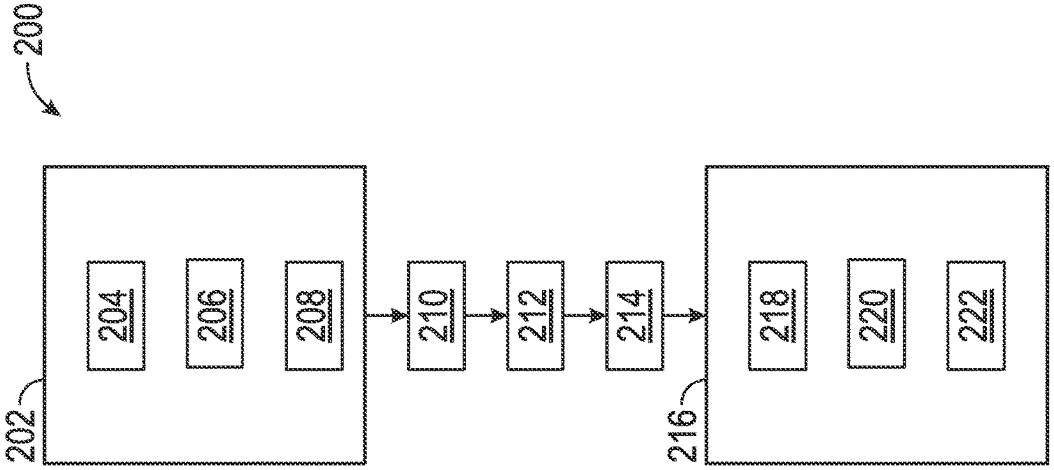
FIG. 8 is a flow diagram of a method of press-fitting components using the tool of FIG. 1, 5 or 6.

A method 200 of press-fitting a component using a tool is shown in a flow diagram in FIG. 8. The method 200 applies to any of the tools 10, 10A, 10B shown and described herein. For purposes of discussion, the method 200 is described with respect to tool 10. The method 200 begins with step 202, press-fitting a first component 18 using a tool 10 that includes a first tool head 14 operatively connected to a tool body 22 and configured to fit the first component 18. As described with respect to FIGS. 1-4, the press-fitting of step 202 includes sub-step 204, pushing the tool body 22 toward the tool head 14 to thereby load a piston 26 within the tool body 22 via a plunger 28 until the plunger 28 aligns with the piston 26 to release the loaded piston 26. The press-fitting of step 202 may also include sub-step 206, determining that the loaded piston 26 has released by an occurrence of an associated audible sound of the piston 26 releasing against the plunger 28. Once the release is determined under sub-step 206, the press-fitting of step 202 may include sub-step 208, withdrawing the first tool head 14 from the first component 18. For example, press-fit installation of the first component 18 to the vehicle 16 is then complete, and the tool head 14 can be withdrawn as the first component 18 is secured to the vehicle 16 in its installed position.

The tool 10 is reconfigurable for different press-fit installation purposes, as described with respect to FIGS. 5 and 6. Accordingly, the method 200 may include step 210, removing the first tool head 14 from the tool body 22, and step 212, operatively connecting a second tool head 14A to the tool body 22. As described with respect to FIG. 5, the second tool head 14A is configured differently than the first tool head 14 and is configured to press-fit a second component 18A configured differently than the first component 18.

Additionally, the tool 10 can be optionally reconfigured in step 214 by replacing a first spring 60 that biases the piston 26 with a second spring 60A as in FIG. 5. The second spring 60A can have a second stiffness different than the first stiffness of the first spring 60, resulting in a different predetermined load PL required for loading the spring 60A prior to release, and a different dynamic load PL upon release. For example, the second component 18A may require greater loading for press-fit installation.

Next, the method 200 includes step 216, press-fitting the second component 18A using the tool 10A. Similarly to step 202, press-fitting the second component 18A under step 216 includes step 218, pushing the tool body 22 toward the tool head 14A to thereby load the piston 26 within the tool body 22 via the plunger 28 until the plunger 28 aligns with the piston 26 to release the loaded piston 26.

The press-fitting of step 216 may also include sub-step 220, determining that the loaded piston 26 has released by an occurrence of an associated audible sound of the piston 26 releasing against the plunger 28. Once the release is determined under sub-step 220, the press-fitting of step 216 may include sub-step 222, withdrawing the second tool head 14A from the second component 18A. For example, press-fit installation of the second component 18A to the vehicle 16 is then complete, and the tool head 14A can be withdrawn as the second component 18A is secured to the vehicle 16 in its installed position.

While the best modes for carrying out the many aspects of the present teachings have been described in detail, those familiar with the art to which these teachings relate will recognize various alternative aspects for practicing the present teachings that are within the scope of the appended claims.

The invention claimed is:

1. A tool comprising:

a tool body having a longitudinal axis;

a biased piston, a plunger, and a base contained in the tool body; wherein the plunger is positioned between the biased piston and the base and in contact with the base;

a tool head fixed to the base and extending outside of the tool body;

wherein the tool body is configured to be movable along the longitudinal axis relative to the base and plunger to move the plunger to load the piston when a load is applied along a first load path that extends through the tool body, the plunger, the base, and the tool head; and wherein the tool body, the base, and the biased piston are configured to align the plunger with the longitudinal axis only when the load applied along the first load path is at least a first predetermined load, and thereby release stored energy of the piston as a dynamic load applied to the tool head along a second load path that extends through the plunger, the base, and the tool head and avoids the tool body.

2. The tool of claim 1, wherein the tool body has a first cavity, a second cavity, and a tapered passage connecting the first cavity and the second cavity; wherein the tapered passage is centered along the longitudinal axis; and wherein the piston, the plunger, and the tapered passage are configured so that a gap is maintained between the piston and the tool body when stored energy of the piston is released, thereby preventing the second load path from passing through the tool body.

3. The tool of claim 2, wherein the piston has an outer surface with a recess that is substantially aligned with the tapered passage; and wherein the plunger has a tip configured to be received in the recess when the plunger is aligned with the longitudinal axis.

4. The tool of claim 2, wherein the base has a first curved surface; wherein the plunger has a contact surface; and a biasing element in the second cavity biasing the contact surface against the first curved surface.

5. The tool of claim 2, wherein the biasing element is a tapered spiral spring concentric with the longitudinal axis, and having a first end positioned against the tool body and a second end positioned against the plunger.

6. The tool of claim 2, further comprising:

a spring positioned in the first cavity and configured to bias the piston toward the tapered passage.

7. The tool of claim 2, wherein the first cavity is filled with compressible fluid, and further comprising:

a seal retained by the piston between the piston and the tool body.

8. The tool of claim 2, wherein the tool head is a first tool head configured to be removable from the base; and further comprising:

a second tool head configured to be fixed to the base for press-fitting a second component different than the first component.

9. The tool of claim 8, further comprising:

a first spring having a first spring stiffness positioned in the first cavity and configured to bias the piston toward the tapered passage when the first tool head is fixed to the base; and a second spring having a second spring stiffness positioned in the first cavity and configured to bias the piston toward the tapered passage when the second tool head is fixed to the base.

10. A tool for press-fit installation of a component, the tool comprising:

a tool body having a first cavity, a second cavity, and a tapered passage connecting the first cavity and the second cavity; wherein the tapered passage has a longitudinal axis;

a piston housed in the first cavity and biased toward the tapered passage; wherein the piston has an outer surface with a recess that is substantially aligned with the longitudinal axis;

a base positioned in the second cavity and having a first curved surface;

a tool head for press-fitting a component; wherein the tool head is fixed to the base and extends outside of the tool body; wherein the base and the tool body are configured such that the tool body slides relative to the base when force is applied on the tool body toward the tool head;

a plunger positioned in the second cavity;

a biasing element in the second cavity biasing the plunger against the first curved surface of the base and away from the first cavity;

wherein the plunger and the base are configured so that the plunger is in a first position tilted relative to the longitudinal axis in a first state;

wherein the plunger is configured to extend into the first cavity through the tapered passage and load the piston as the plunger is moved toward a position aligned with the longitudinal axis by the tool body at the tapered passage so that the tip of the plunger moves into the recess when the predetermined force is applied on the tool body, thereby releasing the piston and directing a dynamic load of stored energy of the piston through the plunger, the base, and the tool head;

wherein the piston, the plunger, and the tapered passage are configured so that a gap is maintained between the piston and the tool body when the piston is released, thereby preventing the dynamic load from passing through the tool body.

11. The tool of claim 10, wherein the biasing element is a tapered spiral spring concentric with the longitudinal axis; wherein the tapered spiral spring has a first end positioned against the tool body and a second end positioned against the plunger.

12. The tool of claim 10, further comprising:

a spring positioned in the first cavity and configured to bias the piston toward the tapered passage.

13. The tool of claim 10, wherein the first cavity is filled with compressible fluid, and further comprising:

a seal retained by the piston between the piston and the tool body.

14. The tool of claim 10, wherein the tool head is a first tool head configured to be removable from the base; and further comprising:

a second tool head configured to be fixed to the base for press-fitting a second component different than the first component.

15. The tool of claim 14, further comprising:

a first spring with a first spring stiffness positioned in the first cavity and configured to bias the piston toward the tapered passage when the first tool head is fixed to the base; and a second spring with a second spring stiffness positioned in the first cavity and configured to bias the piston toward the tapered passage when the second tool head is fixed to the base.

* * * * *